United States Patent
Thorland et al.

(12)

(10) Patent No.: US 6,457,071 B1
(45) Date of Patent: Sep. 24, 2002

(54) SYSTEM AND METHOD FOR DETERMINING CONNECTION ACCURACY AT AN INTERFACE

(75) Inventors: Miles Thorland, Fort Collins; Mark A Wahl, Windsor, both of CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/368,813

(22) Filed: Aug. 5, 1999

(51) Int. Cl.[7] .......................... G06F 11/00; G06F 11/22
(52) U.S. Cl. .................. 710/19; 710/8; 710/13; 710/100; 340/825.06
(58) Field of Search ............................. 710/100, 19, 8, 710/13; 340/825.06

(56) References Cited

U.S. PATENT DOCUMENTS

| | | | | |
|---|---|---|---|---|
| 5,365,221 A | * | 11/1994 | Fennell et al. | 340/636 |
| 5,377,357 A | * | 12/1994 | Nishigaki et al. | 395/800 |
| 5,751,965 A | * | 5/1998 | Mayo et al. | 395/200.54 |
| 5,920,731 A | * | 7/1999 | Pletl et al. | 395/834 |
| 5,982,048 A | * | 11/1999 | Fendt et al. | 307/10.1 |
| 6,222,910 B1 | * | 4/2001 | Price et al. | 379/93.37 |

FOREIGN PATENT DOCUMENTS

JP          409044271 A   *  2/1997   ............. G06F/1/18

\* cited by examiner

*Primary Examiner*—Jeffrey Gaffin
*Assistant Examiner*—Rehana Perveen

(57) ABSTRACT

The present invention relates to a mechanism for detecting the correct or incorrect attachment of cabling between a host computer and a peripheral device and more generally between any two information processing products. A host computer uses signal transmission and/or particular electrical characteristics to uniquely identify particular pins, and a peripheral device checks the location of these signals and characteristics in its input wires to determine the actual position of a connector in relation to its proper position. Information from the detection can be developed either by the peripheral device or by the host to identify the required corrective action to place the connector in the correct position.

20 Claims, 3 Drawing Sheets

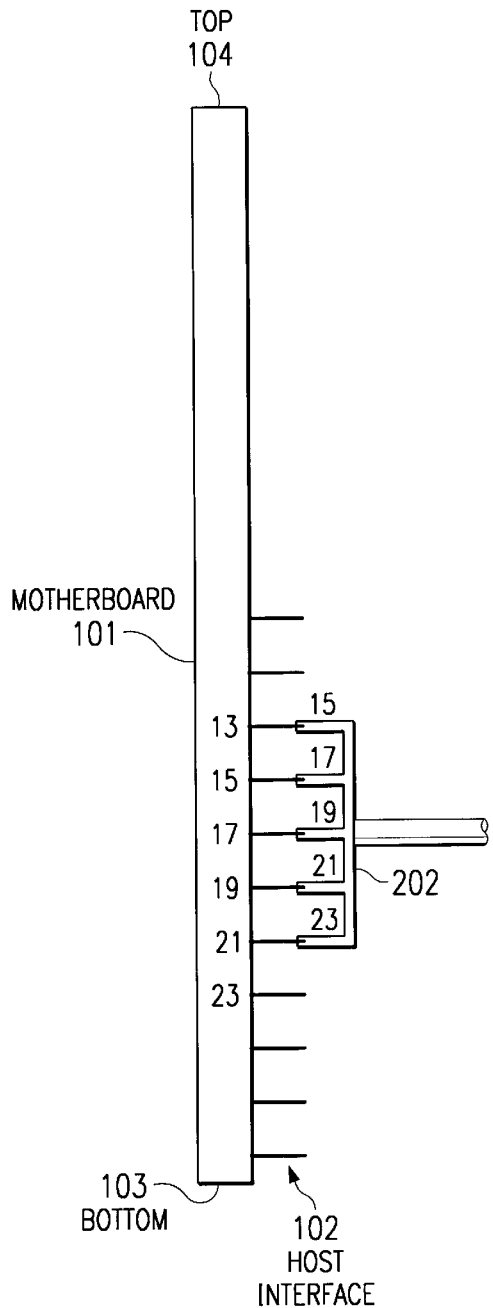
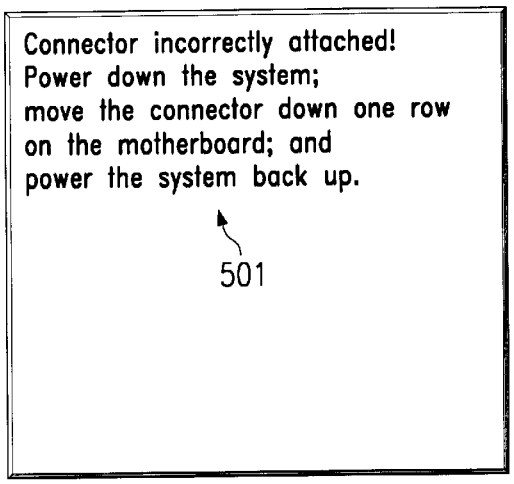
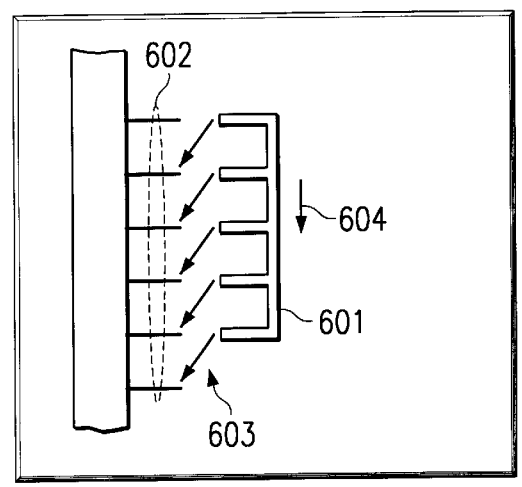

SYSTEM AND METHOD FOR DETERMINING CONNECTION ACCURACY AT AN INTERFACE

BACKGROUND

Often, when connecting equipment together in the field of information systems, it is necessary to connect cables having connectors to other connectors or to a board having a large number of pins to enable proper communication along the cables from one device to another. It is also necessary to connect power cables between different devices within the information system. One example of such a connection is between a computer peripheral and a main or host computer, such as a personal computer.

A problem encountered when making such connections is that of ensuring that the connector leading from a peripheral component is connected properly to the opposing connector, or to the pins on a board to which connection is sought. Possible errors in effecting such a connection include, failure to make conductive contact, error in linear placement of the peripheral's connector so as to be off by a row, by a pin, having the connector rotated a half turn from its proper position, or a combination of these errors. A variety of peripheral components including those having I.D.E. (Integrated Drive Electronics) interfaces and connectors may be subject to such connection problems.

Typically, in the prior art, once a system is powered up with an improperly connected component, the main system, such as a personal computer, will not work because the main computer bus has been corrupted. Computer owners may be tempted to begin dismantling their equipment to look for the problem, or call a customer support line to seek resolution of the problem, both of which are time consuming approaches. Further, the user may well not know whether the connection of the peripheral is the cause of the computer malfunction since the computer as a whole is not working. Repeated unsuccessful attempts to connect cables may result in damage to the computer or to a peripheral component in the form of broken connection pins, improper connections of power supplies to ground, and improper connections of high voltage levels to delicate circuits.

One prior art approach to dealing with possible unsuccessful connection of computer equipment is to prepare diagrams for customer use to show how each connector is to be attached. The diagram may leave open the possibility of the connector being attached in a position reversed from its proper position without it being obvious in comparison to a view shown on the diagram. Further, this approach can only provide guidance to the user prior to connection. Once a faulty connection is made the diagram offers no assistance in correcting the connection.

Another approach to preventing incorrect connection is to use a colored coating on a portion of cable insulation leading up to a connector. A problem here is that, while the color identification may aid the user in correctly identifying a particular pin on the connector, the part to which the connector will be attached, such as a motherboard, may not have color identification to match that on the connector. As with other prior art methods, this approach only helps the user prior to making the connection.

Yet another prior art approach to dealing with the problem of incorrect peripheral to host connection involves physically keying a connector such that it fits into its intended position more readily in one position and orientation than any other. A problem with this approach is that, often, a keyed connector can be inserted incorrectly by applying force. As with the other prior art approaches discussed, this approach can only help the user make the connection correctly in the first place. If the user misses the queue provided by the keying on the connector, and believes the connection to have been properly made, the keying is of no use in guiding the user in identifying the source of a subsequent computer malfunction.

In all the approaches discussed above, a computer malfunction resulting from an improper connection of a peripheral device, including devices with IDE interfaces, and a main computer system, will likely lead to considerable expenditure of time to find and resolve the error, a need to call a customer support line which may be quite costly, and possibly to a user meddling with parts of the computer system which have not malfunctioned, potentially causing further problems.

Therefore, there is a need in the art for a system and method for correcting improper connections between computers and peripheral devices in a time and cost effective manner.

There is a further need in the art for a system and method for enabling computer users to correct incorrect peripheral connections in a self-sufficient manner, that is, without the need to contact a customer support line.

There is a still further need in the art for a system and method for specifically identifying how a peripheral has been improperly connected to a computer after connection has been made.

There is a still further need in the art for a system and method which will provide information to enable a user to correct an incorrect connection between a computer and peripheral device after the connection has been made.

SUMMARY OF THE INVENTION

These and other objects, features and technical advantages are achieved by a system and method which allows signals to be sent along the communication lines between the computer and peripheral device thereby enabling the computer and/or peripheral device to determine whether there is an error in the connection between the two, and if such error exists, to identify the nature of the error and the required corrective action. The host and/or peripheral device may also check for the presence and location of conductive lines with specific hardware electrical characteristics, such as connection to ground, to determine the placement of the connector in relation to the desired correct position.

In a preferred embodiment, after connection is made between a peripheral device and a host computer, software running on the host computer transmits identifying signals along at least one conductive line of the host-peripheral connection, with specific signals being associated with specific pins and specific wires attached to said pins. The peripheral device acts to monitor the signals coming in on the various communication lines to determine whether the signals detected on the various communication lines are located where they are expected or not.

If the signals coming into the peripheral device are correctly located, the peripheral communicates this fact back to the host which can then appropriately communicate this fact to a user. If the signals coming into the peripheral are incorrectly located, the peripheral device compares the location at which the signals are found to the location known to be correct for the various signals, and thereby determines the actual location of the connector in relation to its desired location. For example, assuming that the pins along one side of a inline connector are numbered so as to skip numbers, such as 1, 3, 5, etc., if the signals expected on lines 3, 5, and 7, appeared on lines 5, 7, and 9, respectively, the peripheral device would determine that the connector was misplaced by one pin location along the length of the connector. In a similar manner, the peripheral device would determine if the connector was misplaced by a row and/or column, reversed, or combinations thereof.

After determining the relative location error, if any, of the connector at the host location, the peripheral device would determine the required corrective action to place the connector in the right place, and communicate this information to the user. Communication of the connection status from the peripheral device to the user may be accomplished directly though the use of a display device (such as an LCD or a plurality of LEDs) attached directly to the peripheral device (such as a hard drive or CD-ROM), or communicated to the host computer which in turn would display the error and correction information to the user.

In an alternative preferred embodiment, the signals used to identify the correctness of the connection between the computer and peripheral could be generated by the peripheral device, and received by the host computer. The host would perform the same analysis on the incoming data as described above in connection with the peripheral device to determine whether there is an error in the connection, and if so, the precise nature of that error. The host computer, having the connection error information, would then be able to directly inform the user of the connection error and of the corrective action needed.

In another alternative preferred embodiment, the communication between the peripheral device and the host computer could be monitored by a third hardware device such as a monitoring device, which is able to receive the transmitted diagnostic signals as inputs, and performs the above described analysis to determine whether a connection error exists. The monitoring device then transmits the information to the host computer for display to the user.

In another preferred embodiment, the peripheral device would determine the correctness or error of its connection to the host computer by detecting the electrical characteristics of the various electrical lines. The electrical characteristics which could be checked include, but are not limited to ground connections, power connections, non-connections (open circuits), short circuit connections, and logic lines. The peripheral device could also measure the voltage, current, resistance, impedance, inductance, and/or capacitance instantaneously present on a line to determine the identity of that line. The peripheral device would check to see if selected communication lines have the characteristics that they are expected to have. If the measured characteristics of the lines match the expected characteristics, then the peripheral concludes that the connection to the host is proper, and communicates this information to the host. If there is a mismatch between the expected and measured electrical characteristics, the peripheral device determines that the connection is faulty, identifies where the connector resides in relation to its correct position and the required corrective action, and communicates this information to the host.

Alternatively, the peripheral device could establish the electrical characteristics of the conductive lines, and the host computer could detect the location of particular characteristics on particular lines.

In an alternative embodiment, the inventive device may be able to correct for a misaligned connection without the user having to take corrective physical action depending upon the nature of the misalignments. For example, if the cable has been connected in an orientation which is rotated 180 degrees from its correct alignment, the device may reroute the lines to the appropriate pins on the device's controller. This embodiment may also detect short circuit and open circuit conditions on the cable and connectors arising from either missing or bent pins.

For each of the embodiments of the invention, the host will have or will acquire the information regarding any incorrect placement of the connector and information required to correct such positioning error, and communicate this information to the user.

Therefore, it is an advantage of the present invention that improper connections between computers and peripheral devices can be corrected in a time and cost effective manner.

It is a further advantage of the present invention that it enables computer users to correct improper connections between a computer and peripheral devices in a self-sufficient manner.

It is a still further advantage of the present invention that the nature of an incorrect connection between a computer and a peripheral device can be specifically identified.

It is a still further advantage of the present invention that, rather than merely guiding a user in attaching a connector properly in the first place, the invention enables the user to correct an erroneous connection after such connection has been made.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which:

FIG. 2 depicts a connection between a connector belonging to a peripheral device and a set of pins attached to a board on a host computer according to a preferred embodiment of the present invention;

FIG. 5 depicts textual communication which a host computer would communicate to a computer user in response to an incorrect connector attachment according to a preferred embodiment of the present invention;

FIG. 6 depicts graphical information which a host computer would communicate to a computer user in response to an incorrect connector attachment according to a preferred embodiment of the present invention;

DETAILED DESCRIPTION

Figure 1:
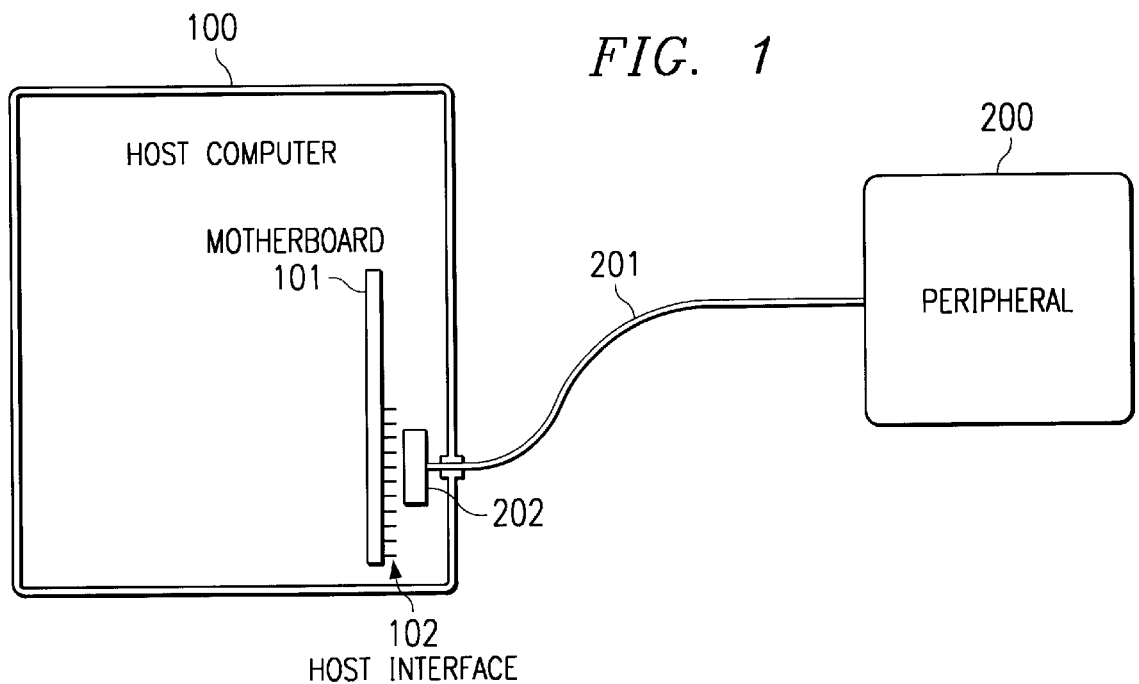
FIG. 1 depicts a block diagram showing a host computer, peripheral device, and a connection between them according to a preferred embodiment of the invention.

FIG. 1 depicts a block diagram showing a host computer 100, peripheral device 200, and a connection cable 201 between them according to a preferred embodiment of the invention. The host comprises various boards to which a peripheral device may be connected including a motherboard 101. Region 102 on the motherboard 101 serves as the host interface 102 to which a connector 202 belonging to the peripheral device 200 is attached.

The peripheral device may be any one of a variety of devices attachable to a computer including but not limited to a hard disk drive, CD ROM drive, tape drive, solid state memory device, printer, monitor, or other device which exchanges data with a host computer.

The connection between the peripheral device and the computer enabled by the peripheral connection cable 201 may have any one of several logic protocols, and any one of many hardware configurations including but not limited to IDE, SCSI, parallel, and RS-232. The inventive mechanism is not limited to any one communication protocol or hardware configuration.

The means of connection between the host interface 102 and the connector 202 is generally depicted in FIG. 1 as comprising a rectangular array of pins on the host side mating with a set of receptacles (not shown) in the connector 202. The inventive principle is not limited to any one physical connection configuration however. Either the host interface side and/or the connector may comprise pins, receptacles which receive pins, or a combination of the two. Further, the cross-sectional geometry of the connection need not be rectangular, but may comprise any shape. Instead of pins and matching pin receptacles, various other forms of conductive contacts may be employed on either side of the connection without departing from the scope of the present invention.

Host connection board 101 is referred to as a motherboard in the preferred embodiment. However, the inventive concept is not limited to connections to the motherboard. Connection of the peripheral equipment may be made to other boards or cards within the host computer and still benefit from the connection detection mechanism of the present invention.

In the following, various configurations are described for enabling the host and peripheral to detect a correct or incorrect connection between themselves, and in the case of an incorrect connection, to determine the precise degree and nature of the error and provide information necessary for a user to correct the connection.

FIG. 2 depicts a connection between a connector 202 attached to a peripheral device 200 (FIG. 1) and a set of pins attached to a board 101 on a host computer 100 (FIG. 1) according to a preferred embodiment of the present invention. In FIG. 2, connector 202 which is attached to peripheral device 200 (FIG. 1), is shown next to a set of pins on motherboard 101. FIG. 2 is presented as merely one example of an incorrect connection of the connector to the motherboard, and the invention is not limited to the pin configuration displayed.

For the sake of this example, it is expected that pins and receptacles therefor of like identifying number are to be joined together. There are receptacles 15, 17, 19, 21, and 23, which ideally should be joined, respectively, with pins 15, 17, 19, 21, and 23. In the example shown, the connector 202 is off by one pin with the result that all receptacles on connector 202 are connected to the wrong pins on board 101. In order to provide a frame of reference, the board 101 has a top 104 and a bottom 103, however the invention is not limited to the board configuration displayed.

Figure 3:
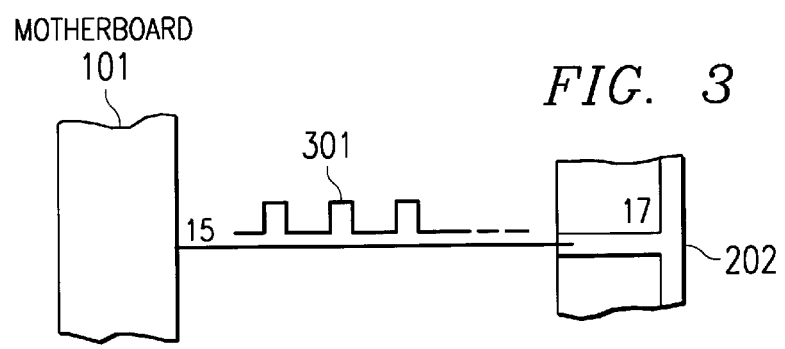
FIG. 3 symbolically depicts transmission of a test signal along a communication line between a host computer and a peripheral device according to a preferred embodiment of the present invention.

FIG. 3 symbolically depicts transmission of a test signal 301 along a communication line which is a subset of a connecting cable 201 (FIG. 1) between a host computer 100 and a peripheral device 200 according to a preferred embodiment of the present invention. Pin 15 emanates from board 101 in the host computer 100 and is connected to receptacle 17 on the connector 202 which is attached to the connection cable 201 belonging to the peripheral device 200. The transmission of a test signal 301 is but one means of determining the correctness or incorrectness of the host-peripheral connection. Other means for detecting connection errors are contemplated for the invention, including, for example, checking the electrical characteristics of receptacle 17 once connected to Pin 15.

In a preferred embodiment of the present invention, the host 100 transmits a test signal 301 to determine whether there is a proper connection between the host 100 and the peripheral device 200. The test signal 301 shown in FIG. 3 is a series of pulses but may assume any form recognizable to another device without departing from the scope of the present invention. The test signal is preferably a periodic signal within a reasonable frequency range, and could be a square wave, sine wave, or have any other geometric configuration. An encoded signal could also be employed to identify a particular line.

In a preferred embodiment, the host 100 and peripheral device 200 are set up in advance, to transmit and receive a test signal, respectively, along one or more pre-selected lines. In the example illustrated in FIG. 3, the host transmits along pin 15 and the peripheral expects to receive along receptacle 15. It is assumed for the sake of this example that a proper connection results in pins and receptacles of like identifying number being connected together. The peripheral device 200 preferably samples a number of different receptacles in anticipation of the possibility of mismatch between pin number and receptacle number. For the sake of distinguishing the pins from each other, the host or other transmitting device ensures that no two pins have the same signal transmitted on them at the same time.

The peripheral device proceeds to sample first on receptacle 15 and, in the example provided, will not find the expected identifying signal. As the host 100 continues to transmit the signal 301, the peripheral 200 begins to sample various other receptacles on connector 202. Upon reaching receptacle number 17, the peripheral device recognizes the identifying signal 301 and concludes that receptacle 17 is connected to pin 15. Having knowledge of the geometry of its own connector 202, and of the geometry of the board 101 in the host computer 100 (which knowledge can be readily programmed into the peripheral device by the manufacturer, or at a later stage), software in the peripheral device proceeds to determine the actual position of the connector with respect to its desired position. In the example presented, the connector is located one pin too far toward the top, or "too high" on the board or motherboard 101, and must be moved "down" by one pin, or one row of pins, in order to be correctly located. The above presents a simple example of incorrect connection. For more complicated combinations of positioning errors, more than one signal will have to detected to completely describe the positioning error of the connector on the board.

Upon making the determination as to where the connector is located, and where it belongs, the peripheral 100 preferably communicates this information back to the host computer 200 which is then able to communicate this same information to the computer user. FIGS. 5 and 6 discuss communication to the user by the host computer.

For the above described transmission and detection scheme to work, it may be necessary to implement changes in the character of certain lines or pins connected to the peripheral device. During normal operation of the peripheral device, such as one using an IDE interface, some lines are bidirectional while others function exclusively as inputs, or exclusively as outputs.

In the present invention, the inputs to the peripheral device attached to the conductive lines leading to the connector are all or substantially all bidirectional. During power-up of the system, each line is electrically tri-stated, meaning that the lines are in a high impedance state and neither sink nor source power to any device. When the peripheral is powered up for the first time, these lines, or a portion of the lines, would go into "input-only" mode and present a high impedance connection to the communications bus. Presenting a high impedance connection to the bus prevents any adverse effect on the bus, such as corruption of data thereon.

Once the peripheral device has determined the location of the identifying signal sent by the host, it is desired to have the peripheral device communicate certain information to the host. It is now necessary to switch some of the pins or wires which are part of the peripheral's connection to the host to an "output" status to enable transmission of data to the host.

The above discussion in connection with FIG. 3 involves a detection scheme in which the host computer transmits pin (and associated attachment wire or line within the connection cable) identification information along one or more selected lines, and the attached peripheral device conducts a detection scheme to find where an expected identifying signal is located among the wires coming into the peripheral device.

In an alternative preferred embodiment, the peripheral device could transmit the identification information along one or more selected wires, and the host computer would perform detection so as to locate the expected signal among the wires coming into the host computer side of the connection which is preferably a motherboard.

In yet another alternative preferred embodiment, both the peripheral device and the host computer would possess the ability to transmit identifying signals along selected lines as well as the ability to search for and detect such identifying signals transmitted by the other device (where both the host computer and peripheral are "devices").

Figure 4:
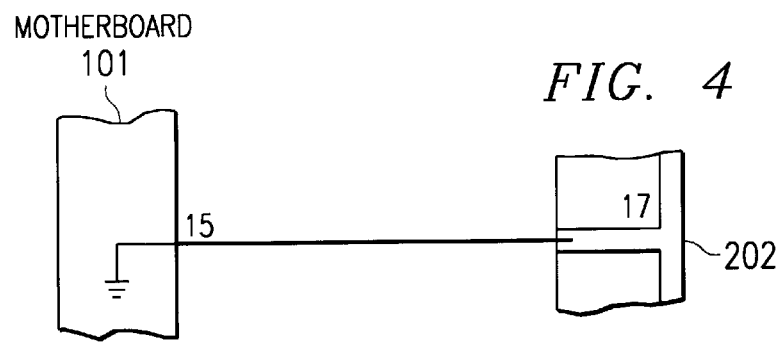
FIG. 4 depicts a connection along a single communication line between a peripheral device and a host computer in which one pin is connected to ground according to a preferred embodiment of the present invention.

FIG. 4 depicts a connection along a single communication line between a peripheral device and a host computer in which one pin is connected to ground according to a preferred embodiment of the present invention.

As an alternative to transmitting some form of periodic or encoded signal along one or more wires (or conductive lines) of a connection cable thereby uniquely identifying said wires, a wire and its associated pin on the motherboard 101 can be identified by its "electrical characteristics." The electrical characteristics which could be used to identify a particular wire and pin include, but are not limited to ground connections, non-connections (open circuits), logic lines, current flowing along the wire or pin, and lines hard wired to constant voltage sources which may be at 5 volt, 12 volt, or other voltage levels.

The term electrical "features" as used elsewhere in this document may refer either to the more hardware oriented "electrical characteristics" described in the foregoing, or in the alternative, to signals transmitted along conductive lines. Thus, "features" is used as the inclusive broad term, and "electrical characteristics" as a narrower term, examples of which are described above.

FIG. 4 illustrates a continuation of the treatment of the example initially presented in FIG. 2. Instead of identifying pin 15 by transmitting a signal along this wire originating in the host as shown in FIG. 3, pin 15 is identified by the electrical characteristic of being tied to ground. The peripheral device 200, as with the case in FIG. 3, expects to find this characteristic on receptacle 15, since the example of FIGS. 2, 3, and 4 is set up such that when properly connected, pins and receptacles with the same number are connected together.

The peripheral device 200 samples receptacle 15 to check for the characteristic of electrical ground but will not find it because the connector is improperly attached. The peripheral will then sample nearby receptacles to find out where the ground is located. In the example provided, the peripheral will identify receptacle 17 as having the electrical characteristic of being connected to ground. The peripheral will therefore know that receptacle 17 is connected to pin 15. Thereafter, in like manner to the above discussion in connection with FIG. 3, the peripheral will know that the connector is improperly attached, where the connector currently resides relative to its proper position, and what steps are needed to move the connector into its proper position. It should be noted that an electrical ground is only one of several possible electrical characteristics which can be searched for in order to identify the location of the connector 202 on the board 101.

The above discussion presents a simple example of connector misplacement for illustrative purposes. In order to fully describe the location of an improperly located connector, more than one conductive line having a recognized electrical characteristic would be identified.

Whether signal transmission or electrical characteristics are used to identify particular pins or wires, the modes of communication employed to convey the connector 202 position on the board 101 first to the host 100 and then to the user, depend upon the connection made, or not made, between the connector 202 and the board 101.

In a first instance, where the connector 202 is properly attached to the board 101, the peripheral device identifies the position of the connector as being correct and communicates this information back to the host along wires selected in advance for such communication purposes. A second case involves a connector 202 which is incorrectly connected to the board 101. In this case, the wires on the peripheral side and on the host side originally intended to be used for communication between the devices, are in all likelihood, not connected. Both devices will have software, which in this situation, acts to look for alternative communication lines between the devices to permit both communication and appropriate handshaking to occur in spite of the error in connection. Once the devices find an acceptable number of connected lines (preferably two), the transmission of connector position information from the peripheral to the host can proceed. For example, the peripheral device could locate the data line locations and proceed to communicate with the host over these lines.

A third case arises when a connector is connected so far from its proper position that the peripheral device cannot identify the location or even any contact of the board with the connector. This will arise if the wires which are tied to ground or have other distinctive electrical characteristics, and the wires which the host uses to send identifying signals along, are either completely out of contact with the connector, or are in contact with lines on the connector which the peripheral device does not scan for identifying signals or electrical characteristics. In this case, the peripheral and host are not in communication with each other at all.

In this totally uncommunicative condition, the host, after a certain period of time, will conclude that the connector is either entirely absent, or connected far from its proper position and can display a message to the user indicating this finding. The peripheral device, being unable to locate an identifying feature on any incoming line may also communicate the lack of connection directly to the user. Such communication can comprise the use of "blink codes" which cause an LED or other light on the peripheral to turn on and off a fixed number of times, or to turn on a dedicated hazard light specifically indicating a lack of connection to the host.

In a preferred embodiment, the peripheral communicates connector position and any required correction information to the host computer. Alternatively, the communication from the peripheral to the host could be minimized by having the peripheral communicate only minimal information to the host computer and allowing the host computer to perform analysis which yields the relative position information and required corrective action. Employing the latter approach in the above example, the peripheral device, upon detecting a ground on receptacle 17, would communicate the receptacle number to the host. From there, the host would calculate the relative position of the connector in relation to its desired position and the corrective action necessary to place it in the correct position.

The host could then present the information the user in a variety ways including but not limited to textual and/or graphical information on a monitor or display, and printing a brief report on the connection status as well as the steps required to correct the connection. Printing a list of corrective steps would be helpful since the system will preferably be powered down before changing the connection, and any electrically powered display connected to the computer would be inoperative during the power down period. With a printed report, the user would have complete information, possibly including both textual and graphical information, to guide the user through the connector removal and re-connection process.

The above discussion in connection with FIG. 4 involves a detection scheme in which the host computer establishes certain electrical characteristics for selected pins (and associated attachment wire or line within the connection cable), and the attached peripheral device conducts a detection scheme to find where one or more types of electrical characteristics (such as ground lines, open circuits, logic lines, and fixed d.c. voltage lines) are located among the wires coming into the peripheral device.

The preferred embodiment of FIG. 4 comprises an arrangement wherein the host establishes electrical characteristics and the peripheral device detects them. In an alternative embodiment however, the peripheral device could establish electrical characteristics for one or more selected pins or wires, and the host computer would perform detection so as to locate the expected electrical characteristics among the wires coming into the host computer side of the connection, which is preferably a motherboard. In yet another alternative embodiment, both the peripheral device and the host computer would possess the ability to establish certain electrical characteristics for selected pins or wires, as well as the ability to search for, or detect, such electrical characteristics transmitted by the other device (where both the host computer and peripheral are "devices").

With regard to both FIGS. 3 and 4, the above discussion describes having the peripheral device determine the actual location of a communication signal or of an electrical characteristic such as a ground connection. The discussion of the preferred embodiment further describes having the peripheral device perform an analysis of any error and required correction in the connector position and communicate the resulting data to the host. Alternatively, however, the analysis of positioning error and required corrective action could be performed by the host computer.

FIG. 5 depicts a display 500 presenting textual communication 501 which a host computer 100 would communicate to a computer user in response to an incorrect connector attachment according to a preferred embodiment of the present invention. Where the host computer 100 receives information from the peripheral, or has information determined through its own diagnostics describing the incorrect placement of a connector on the motherboard or other board on the host computer 100 and the required corrective action to attach the connector properly, the host may subsequently display this information to the user employing a standard monitor or other display device.

Continuing with the illustrative example discussed in connection with FIGS. 2 and 3, the host would display the text "connector incorrectly attached" to indicate the incorrect connection. By way of indicating corrective action, the computer would then instruct the user to power down the system, move the connector down one level, or row of pins, from its current position, and then power the system back up. Clearly, a range of textual messages could be displayed which would convey functionally equivalent language to the user. Substantively different messages could, of course, be transmitted depending upon the nature of the mis-attachment detected by the inventive mechanism. The system is preferably powered down before any physical connection is altered.

FIG. 6 depicts a display 500 presenting graphical information which a host computer would communicate to a computer user in response to an incorrect connector attachment according to a preferred embodiment of the present invention. Element 602 depicts a graphical display of the motherboard or other board to the user, and element 601 depicts a graphical display of the connector. Arrow 604 shows the direction of motion of the connector required to correctly reattach the connector to the board. Arrows 603 show the desired connections between the receptacles on the connector and the pins on the board.

A range of features could be added to the graphical display including but not limited to listing the numbers of the individual pins and pin receptacles or other means of joining conductive elements, color coding the pins and receptacles such that the ones to be connected are of like color and shading, and using animation to demonstrate the various physical steps required to remove the connector, check for any physical damage, identify the position on the board to which it is to be attached, and re-attach the connector. A range of further visual aids could be used to demonstrate error in attachment between the connector and the board, and to illustrate the required corrective action without departing from the scope of the present invention.

The basic principle of the present invention can be extended to displaying a signal indicating that a peripheral device is experiencing a power connection problem.

Figure 7:
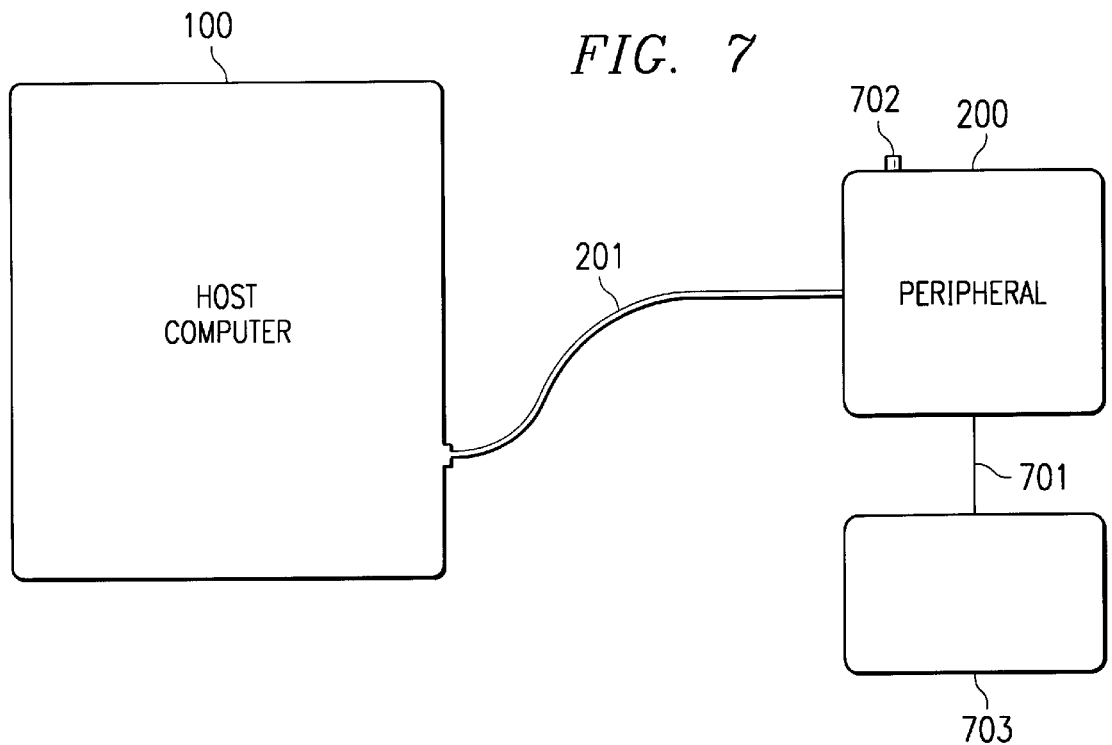
FIG. 7 depicts a host computer and a peripheral device connected by a communication cable.

FIG. 7 depicts a host computer 100 and a peripheral device 200 connected by a communication cable. The communication cable may have an IDE hardware format and communication protocol, but the invention is not limited to such an embodiment. The peripheral device 200 is preferably connected to power source 703 by power cable 701. The following describes a scenario which arises only if the peripheral device 200, for some reason, is not being properly powered by power source 703.

In the event of an improper connection of the power cable 701 between the power source 703 and the peripheral device 200, it is desired to use the communication cable 201, which is presumably properly connected, to operate a low power circuit on the peripheral device to announce the fact that the power cable is improperly connected. The mechanism herein is capable of reporting a lack of power at the peripheral device 200 regardless of the cause of the lack of power.

In a preferred embodiment, upon discovery by the host computer 100 that a peripheral device 200 was connected to the host via a communication cable 201 but was not responding to commands and/or communication from the host, the host would be enabled to use some of the wires in the communication cable to turn on an LED (light emitting diode) 702 on the peripheral device 200. Instead of an LED, other lighting mechanisms or user alert mechanisms could be employed.

In lighting the LED, which preferably is dedicated to the purpose of indicating a failure in the power connection to the peripheral 200, the host is able to rapidly and directly inform a user in a position to observe the LED, that power is failing to reach the peripheral 200 either because of an incorrectly connected power cable, or because of a failure in the power source. Alternatively or additionally, the host computer 100 could send a message to a user terminal connected to the host indicating the power failure condition at the peripheral device 200.

A variety of the operations of controlling, signal transmission, and detection associated with FIGS. 1–7 may be performed in software, in hardware or a combination of the two. A variety of combinations of software and hardware functionality may be practiced without departing from the scope of the present invention.

A set of functions is discussed in the following. A line controller identifies a conductive line by transmitting signals, such as periodic signals or encoded signals, which serve to distinguish that line from others when sampled or inspected by a device capable of receiving and interpreting the transmitted signals. The line controller may also establish "electrical characteristics" on a selected line. The line controller is preferably implemented in the host computer, but alternatively may be implemented in a peripheral device.

A line sampler is employed to sample a number of different conductive lines, pins, or wires to determine which of several possible lines a particular feature or characteristic is present upon. Certain features will be expected to be present on certain lines in the event of a proper connection of an interface between two devices. However, if the feature being sought is not found on the expected line, the line sampler will check several different lines to determine whether the connection has been improperly made, and if so, where the expected signal is. The line sampler is preferably implemented on the peripheral device, but may alternatively be implemented on the host computer.

A conductive line inspector is invoked only once the feature being searched for by the line sampler is found. If the feature in question is found on a line different from that expected, the line inspector will note this fact, and record both the expected and actual line locations associated with the feature. The conductive line inspector is preferably implemented in the peripheral device, but may alternatively be implemented in the host computer.

In the event of a mismatch between the expected and actual line locations associated with a particular feature, a conductive line map is employed to geometrically relate the position of the actual line with respect to the expected line. This information, in combination with knowledge of geometry of the physical connector and the board in the host, can be used to illustrate the nature of the incorrect attachment of the connector to the user as well as the required corrective action for properly positioning the connector on the board. The conductive line map may be implemented in either the peripheral device or the host computer.

Figure 8:
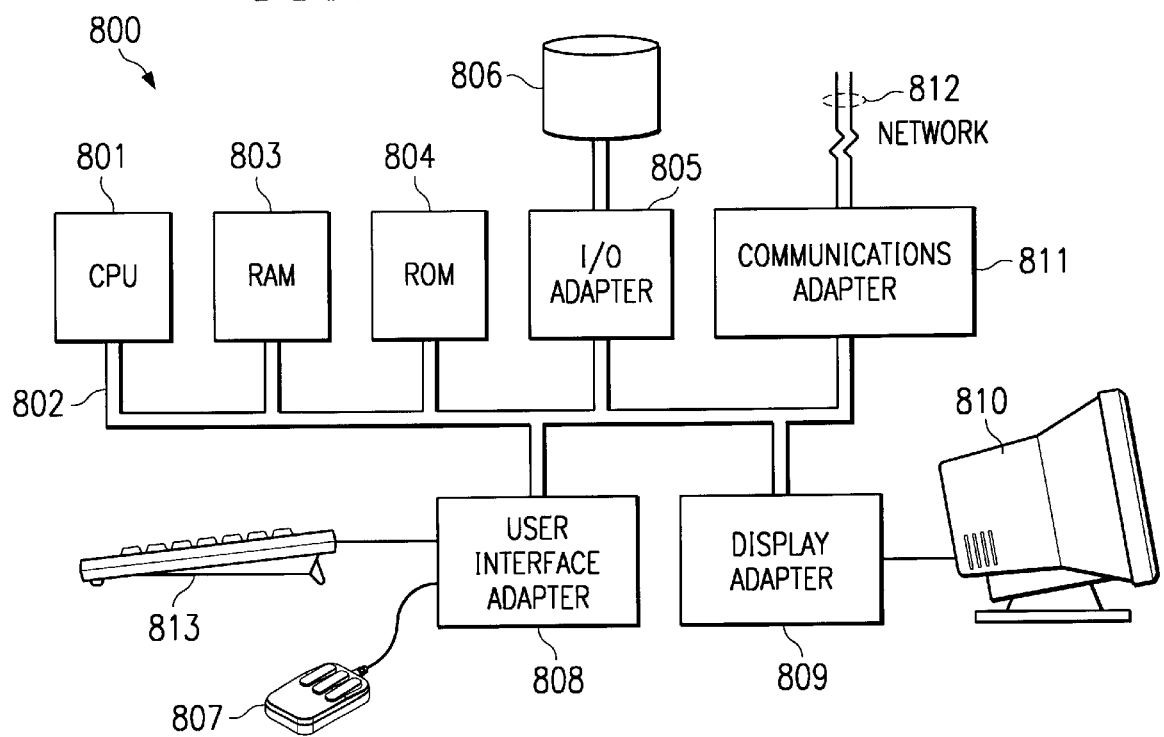
FIG. 8 depicts a computer adapted for use with the present invention.

FIG. 8 depicts a computer system 800 adapted to use the present invention. Central processing unit (CPU) 801 is coupled to bus 802. In addition, bus 802 is coupled to 13 random access memory (RAM) 803, read only memory (ROM) 804, input/output (I/O) adapter 805, communications adapter 811, user interface adapter 808, and display adapter 809.

RAM 803 and ROM 804 hold user and system data and programs as is well known in the art. I/O adapter 805 connects storage devices, such as hard drive 806 or CD ROM (not shown), to the computer system. Communications adaptor 811 couples the computer system to a local, wide-area, or Internet network 812. User interface adapter 808 couples user input devices, such as keyboard 813 and pointing device 807, to the computer system 800. Finally, display adapter 809 is driven by CPU 801 to control the display on display device 810. CPU 801 may be any general purpose CPU, such as a HP PA-8200. However, the present invention is not restricted by the architecture of CPU 801 as long as CPU 801 supports the inventive operations as described herein.

The invention also allows for the detection of missing (open) or shorted pins. It does this by first detecting if the connector is placed on the pins properly. Once this is established, then the host or peripheral can send encoded signals down each line and detect them on the peripheral or host respectively. If a signal is not detected on its respective pin, then an open circuit condition has been detected. If the signal shows up on more than one pin, then a short circuit condition has been detected. In both cases, the information can then be transmitted to the end user in a manner similar to the preceding methods for communicating misplaced connectors.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for measuring an accuracy of an interface connection, the method comprising the steps of:

uniquely identifying at least one conductive line on a first side of said interface connection thereby generating identified lines with identifying characteristics;

searching for said identifying characteristics on at least one conductive line on a second side of said interface connection;

comparing an actual location for at least one line on said second side of said interface connection having identifying characteristics with an expected location for said identifying characteristics; and determining a relative position of said expected location on said second side of said interface connection with said actual location on said second side of said interface, thereby identifying an existence and an extent of connection error, if present, at the interface.

2. The method of claim 1, wherein at least one conductive line leading to the interface connection transmits power.

3. The method of claim 1, wherein said at least one conductive line leading to the interface connection transmits data, thereby forming a communication cable.

4. The method of claim 3, wherein the communication cable has an IDE format.

5. The method of claim 1, wherein the step of uniquely identifying comprises:

transmitting one of a periodic signal or an encoded signal, along at least one conductive line on said first side of said interface connection.

6. The method of claim 1, wherein the step of uniquely identifying comprises:

establishing distinctive electrical characteristics for at least one conductive line on said first side of said interface connection.

7. The method of claim 1, wherein the step of uniquely identifying comprises:

sensing current on a conductive line flowing across said interface connection to determine an identity of said conductive line.

8. The method of claim 1, comprising the further step of:

upon discovering a connection error at said interface connection, identifying corrective action required to correct said connection error at said interface connection.

9. The method of claim 1, wherein:

a device on said first side of said interface connection is a host computer; and a device on said second side of said interface connection is a peripheral device, wherein:

said peripheral device has input lines; and a connection error at said interface, if present, represents error in a placement of a connector of said peripheral device on a board of said host computer.

10. The method of claim 9, comprising the further steps of:

determining corrective action to reposition said connector of said peripheral device on said board of said host computer; and displaying information to a user regarding said corrective action, thereby enabling the user to properly reconnect said connector to said board.

11. The method of claim 9, comprising the further steps of:

tri-stating the conductive lines of said peripheral device upon power up of said peripheral device thereby:

placing substantially all said conductive lines of said peripheral device in an input-only mode; and presenting a high impedance connection between said input lines and a data bus of said peripheral device, thereby preventing interference with said bus.

12. The method of claim 11, comprising the further steps of:

switching at least one conductive line of said peripheral device to output mode to enable communication from said peripheral device to said host computer; and transmitting information from said peripheral device to said host computer regarding a status of said interface connection.

13. The method of claim 12, comprising the further step of:

where the host computer receives no information from the peripheral device, employing selected conductive lines of said host computer to transmit power through said interface to said peripheral device to turn on a light indicating a possible power failure condition.

14. A system for detecting a connection at an interface between a host computer and a peripheral device, the system comprising:

conductive lines leading to said interface from said host computer and from said peripheral device;

distinctive electrical features implemented on at least one conductive line leading to the interface from said host computer to provide information uniquely identifying said at least one conductive line, said distinctive electrical features being transmitted across said interface to at least one corresponding conductive line on a peripheral device side of said interface;

inputs to said peripheral device which are substantially all bi-directional, thereby enabling the peripheral device to receive said information uniquely identifying said at least one conductive line from said host computer; and a detector in said peripheral device for: (i) identifying a peripheral device input having said distinctive electrical features, thereby enabling said peripheral device to determine whether the connection has been improperly made to said peripheral device input; and (ii) identifying conductive lines carrying said distinctive electrical features.

15. The system of claim 14, wherein the distinctive electrical features implemented on the host computer side of the interface comprise:

signals transmitted along at least one selected conductive line by said host computer.

16. The system of claim 14, wherein the distinctive electrical features implemented on the host computer side comprise:

electrical characteristics established for at least one conductive line by said host computer.

17. The system of claim 16, wherein the electrical hardware characteristics are selected from the group consisting of:

electrical ground, open circuit, logic circuit, current level, and a constant voltage line.

18. A computer program product having a computer readable medium having computer program logic recorded thereon for measuring a positioning accuracy of an interface connection, the computer program product comprising:

code for uniquely identifying at least one conductive line on a first side of said interface connection thereby generating identified lines with identifying characteristics;

code to search for said identifying characteristics on at least one conductive line on a second side of said interface connection;

code for recording an actual location for at least one line on said second side of said interface connection having identifying characteristics along with an expected location for said identifying characteristics; and code for determining a relative position of said expected location on said second side of said interface connection with said actual location on said second side of said interface, thereby identifying an existence and an extent of connection error, if present, at the interface.

19. The method of claim 18, wherein the code for uniquely identifying identifies said at least one conductive line by transmitting one of a periodic signal or an encoded signal, along at least one conductive line on said first side of said interface connection.

20. The method of claim 19, wherein the code for uniquely identifying identifies said at least one conductive line by establishing distinctive electrical characteristics for at least one conductive line on said first side of said interface connection.

\* \* \* \* \*